United States Patent
Oishi

(10) Patent No.: US 11,434,345 B2
(45) Date of Patent: Sep. 6, 2022

(54) HIGH DIELECTRIC INSULATING SILICONE RUBBER COMPOSITION AND ELECTRIC FIELD RELAXATION LAYER

(71) Applicant: Shin-Etsu Chemical Co., Ltd., Tokyo (JP)

(72) Inventor: Kazuhiro Oishi, Annaka (JP)

(73) Assignee: SHIN-ETSU CHEMICAL CO., LTD., Tokyo (JP)

(*) Notice: Subject to any disclaimer, the term of this patent is extended or adjusted under 35 U.S.C. 154(b) by 308 days.

(21) Appl. No.: 16/604,345

(22) PCT Filed: Feb. 20, 2018

(86) PCT No.: PCT/JP2018/005950
§ 371 (c)(1),
(2) Date: Oct. 10, 2019

(87) PCT Pub. No.: WO2018/193705
PCT Pub. Date: Oct. 25, 2018

(65) Prior Publication Data
US 2020/0157308 A1 May 21, 2020

(30) Foreign Application Priority Data
Apr. 18, 2017 (JP) .............. JP2017-081910

(51) Int. Cl.
| C08K 3/04 | (2006.01) |
| C08K 3/36 | (2006.01) |
| C08K 5/14 | (2006.01) |
| H01B 3/28 | (2006.01) |
| H01B 3/46 | (2006.01) |

(52) U.S. Cl.
CPC .......... *C08K 3/04* (2013.01); *C08K 3/36* (2013.01); *C08K 5/14* (2013.01); *H01B 3/28* (2013.01); *H01B 3/46* (2013.01); *C08K 2201/006* (2013.01)

(58) Field of Classification Search
CPC ............. C08K 3/04; C08K 3/36; C08K 5/14
USPC ............................................ 524/493
See application file for complete search history.

(56) References Cited

U.S. PATENT DOCUMENTS

| 4,317,001 | A | 2/1982 | Silver et al. |
| 6,013,201 | A | 1/2000 | Hayashida et al. |
| 6,090,879 | A * | 7/2000 | Takuman ........... C08K 9/06 523/203 |
| 6,444,323 | B1 | 9/2002 | Matsumoto et al. |
| 2007/0069187 | A1 | 3/2007 | Tonge |
| 2014/0296387 | A1 | 10/2014 | Matsukura et al. |
| 2015/0380636 | A1 | 12/2015 | Fujisawa et al. |

FOREIGN PATENT DOCUMENTS

| EP | 2 495 285 A1 | 9/2012 |
| JP | 55-149348 A | 11/1980 |
| JP | 4-296359 A | 10/1992 |
| JP | 4-298568 A | 10/1992 |
| JP | 8-22716 A | 1/1996 |
| JP | 10-316859 A | 12/1998 |
| JP | 11-35830 A | 2/1999 |
| JP | 1999035830 | * 2/1999 |
| JP | 11-106657 A | 4/1999 |
| JP | 11-181286 A | 7/1999 |
| JP | 11-190328 A | 7/1999 |
| JP | 2001-158856 A | 6/2001 |
| JP | 2001-221225 A | 8/2001 |
| JP | 2002-332408 A | 11/2002 |
| JP | 2007-514055 A | 5/2007 |
| JP | 2009-109745 A | 5/2009 |
| JP | 2011-116955 A | 6/2011 |
| JP | 2013-177558 A | 9/2013 |
| JP | 2015-76168 A | 4/2015 |
| JP | 2015-153514 A | 8/2015 |
| JP | 2016-505693 A | 2/2016 |
| JP | 2017-2218 A | 1/2017 |

OTHER PUBLICATIONS

International Search Report (PCT/ISA/210) issued in PCT/JP2018/005950, dated May 29, 2018.
Written Opinion (PCT/ISA/237) issued in PCT/JP2018/005950, dated May 29, 2018.

* cited by examiner

*Primary Examiner* — Deve V Hall
(74) *Attorney, Agent, or Firm* — Birch, Stewart, Kolasch & Birch, LLP

(57) ABSTRACT

Provided are a high dielectric insulating silicone rubber composition and an electric field relaxation layer. This high dielectric and insulating silicone rubber comprises: (A) 100 parts by mass of an organopolysiloxane represented by formula (1), $$R^1_n SiO_{(4-n)/2} \quad (1),$$

(in the formula, $R^1$ represents the same or different, substituted or unsubstituted monovalent hydrocarbon groups, and n is a positive number of 1.95 to 2.04); (B) 60 to 150 parts by mass of thermal black having an average primary particle size of 150 to 500 nm; (C) 5 to 100 parts by mass of reinforcing fumed silica having a specific surface area measured by a BET adsorption method of 50 m²/g or more; and (D) 0.1 to 10 parts by mass of a curing agent. The composition is characterized in that a cured product thereof satisfies a dielectric constant of 10 or more, a volume resistivity of $1.0 \times 10^{13}$ to $1.0 \times 10^{17}$ Ω·cm, a loss tangent of 0.1 or less, and a dielectric breakdown strength (BDV) of 7 kV/mm or more.

6 Claims, No Drawings

HIGH DIELECTRIC INSULATING SILICONE RUBBER COMPOSITION AND ELECTRIC FIELD RELAXATION LAYER

TECHNICAL FIELD

The present invention relates to high dielectric silicone rubber composition which can be used in, for example, an electric field relaxation layer at an intermediate joint or a terminal joint in a power cable, and to an electric field relaxation layer.

BACKGROUND ART

When connecting a CV cable (crosslinked polyethylene-insulated PVC-sheathed cable) between CV cables or to a transformer, overhead line or the like, the outer semiconducting layer at the end of the CV cable must be treated in a certain length.

However, when the outer semiconducting layer is simply removed, the electric field concentrates at the end of the outer semiconducting layer, resulting in a loss of electrical characteristics. In order to relax or suppress this electric field concentration, an electric field relaxation layer made of a dielectric having a higher dielectric constant than the cable insulation is provided at the cut or torn portion of the cable shield layer. This utilizes the principle that equipotential lines and electrical stresses refract when passing through substances of differing dielectric constants (Patent Document 1: JP-A 2015-153514).

In this case, rubber compositions having an increased dielectric constant that can be used in an electric field relaxation layer are exemplified by compositions which include a polyolefin, ethylene-propylene rubber, ethylene-propylene-diene copolymer, acrylic rubber or nitrile rubber as the base polymer and include also a high-dielectric substance such as a dielectric ceramic (e.g., a metal oxide, barium titanate) or carbon black (Patent Document 2: 2017-002218). Also, because cable ends are often exposed outdoors, high dielectric materials obtained by including a high dielectric substance in a silicone rubber having an excellent weather resistance have been developed (Patent Document 3: JP-A 2013-177558). In addition, a high dielectric tape which is obtained by forming a high dielectric rubber into a tape and imparts an airtight, contamination-resisting performance to the power cable terminal structure has been developed (Patent Document 4: JP-A 2015-76168).

In order to increase the dielectric constants of the rubber materials used in these applications, π electron transfer-type conductive substances such as carbon black and carbon fibers are often used as conductivity imparting materials. However, it is known that when ordinary carbon black is used, because of the tunneling effect due to the carbon structure, the current-voltage relationship does not obey Ohm's law and becomes nonlinear. Therefore, in electrical power applications such as electrical field relaxation materials at power cable joints and terminals that require resistance control, when the carbon black selection and method of dispersal are unsuitable, contact between carbon structures readily arises, making it difficult to maintain an insulated state owing to the nonlinearity between the current and the voltage.

In high dielectric materials containing carbon black (Patent Document 5: JP-A H08-22716), a somewhat high carbon black loading is needed in order to increase the dielectric constant. Therefore, sufficient insulating properties cannot be maintained and the material becomes electrically conductive or semiconductive. In particular, silicone rubber compositions to which have been added thermal black and/or furnace black of a specific particle size and specific DBP oil absorption are described, but the cured rubbers obtained from such compositions are semiconductive; only cases in which furnace black has been added are disclosed in the Examples.

When the loading of conductivity-imparting material is increased, the dielectric loss tangent which is a desired property important to the electric field relaxation layer rises, the dielectric breakdown strength (breakdown voltage, BDV) drops and the reliability decreases. Silicone rubber compositions in which a conductivity-imparting material has been included in, as the base, a silicone rubber so as to bring the dielectric loss tangent down to 0.1 or below have been described (Patent Document 6: JP-A H11-35830; Patent Document 7: JP-A 2011-116955), but no data whatsoever has been provided on the dielectric breakdown strength (BDV).

PRIOR ART DOCUMENTS

Patent Documents

Patent Document 1: JP-A 2015-153514
Patent Document 2: JP-A 2017-002218
Patent Document 3: JP-A 2013-177558
Patent Document 4: JP-A 2015-76168
Patent Document 5: JP-A H08-22716
Patent Document 6: JP-A H11-35830
Patent Document 7: JP-A 2011-116955

SUMMARY OF INVENTION

Technical Problem

The present invention was arrived at in light of the above circumstances. An object of this invention is to provide a high dielectric insulating silicone rubber composition which has an excellent electric field relaxation ability and a high reliability. Another object is to provide, at an intermediate joint or terminal joint on a power cable, a high dielectric field relaxation layer made of a cured form of the silicone rubber composition.

Solution to Problem

The inventor, as a result of having conducted extensive investigations in order to achieve this object, has discovered that by having a cured product obtained by curing a silicone rubber composition that includes (A) a specific organopolysiloxane, (B) thermal black, (C) reinforcing fumed silica and (D) a curing agent satisfy the following physical properties: a dielectric constant of 10 or more, a dielectric loss tangent of 0.1 or less, a volume resistivity of from $1.0 \times 10^{13}$ to $1.0 \times 10^{17}$ Ω·cm and a dielectric breakdown strength (BDV) of 7 kV/mm or more, the cured product is suitable as a member used in the electric field relaxation layer of intermediate joints, terminals and the like in power cables. This discovery ultimately led to the present invention.

Accordingly, the invention provides the following high dielectric insulating silicone rubber composition and electric field relaxation layer.

[1] A high dielectric insulating silicone rubber composition comprising:
(A) 100 parts by weight of an organopolysiloxane of average compositional formula (1) below:

$$R^1_n SiO_{(4-n)/2} \tag{1}$$

wherein each $R^1$ is the same or different, substituted or unsubstituted monovalent hydrocarbon group, and n is a positive number from 1.95 to 2.04, (B) 60 to 150 parts by weight of thermal black having an average primary particle size of from 150 to 500 nm, (C) 5 to 100 parts by weight of reinforcing fumed silica having a specific surface area as measured by the BET adsorption method of at least 50 m²/g, and (D) 0.1 to 10 parts by weight of a curing agent, wherein the silicone rubber composition, when cured, has a dielectric constant of 10 or more, a volume resistivity of from $1.0 \times 10^{13}$ to $1.0 \times 10^{17}$ Ω·cm, a dielectric loss tangent of 0.1 or less and a dielectric breakdown strength (BDV) of 7 kV/mm or more.

[2] The high dielectric insulating silicone rubber composition of [1], wherein the thermal black (B) has a DBP oil absorption of from 35 to 50 mL/100 g.

[3] The high dielectric insulating silicone rubber composition of [1] or [2], wherein component (C) is a hydrophobic fumed silica.

[4] The high dielectric insulating silicone rubber composition of any of [1] to [3], wherein component (D) is an addition reaction curing agent comprising:

an organohydrogenpolysiloxane of average compositional formula (2) below:

$$R^{20}{}_p H_q SiO_{(4-p-q)/2} \quad (2)$$

wherein each $R^{20}$ is the same or different, substituted or unsubstituted monovalent hydrocarbon group, and p and q are positive numbers which satisfy the conditions 0<p<3, 0<q<3 and 0<p+q≤3, and a hydrosilylation catalyst.

[5] The high dielectric insulating silicone rubber composition of any of [1] to [3], wherein component (D) is an organic peroxide curing agent.

[6] An electric field relaxation layer in a power cable intermediate joint or terminal joint, which layer comprises a cured product of the high dielectric insulating silicone rubber composition of any of [1] to [5].

Advantageous Effects of Invention

This invention makes it possible to provide a high dielectric insulating silicone rubber composition which has an excellent electric field relaxation ability and a high reliability, and to provide also, at an intermediate joint or terminal joint on a power cable, a high dielectric field relaxation layer made of a cured product of the silicone rubber composition.

DESCRIPTION OF EMBODIMENTS

The invention is described more fully below.

In this invention, the specific surface areas of thermal blacks and reinforcing fillers are values measured by the BET adsorption method. "Millable silicone rubber composition" refers herein to a silicone rubber composition which at room temperature (25° C.) is generally in a highly viscous non-liquid state without self-flowability and which can be uniformly kneaded under shear stress with a mixing apparatus such as a roll mill (e.g., a two-roll mill or three-roll mill). "Organopolysiloxane crude rubber" refers to an organopolysiloxane ingredient which has a high degree of polymerization (high viscosity) of from 100 to 100,000 and which at room temperature (25° C.) is generally in a non-liquid state without self-flowability.

The silicone rubber composition of the invention includes components (A), (B), (C) and (D).

[(A) Organopolysiloxane]

The organopolysiloxane (A), which serves as the base polymer of the composition, is a polymer of average compositional formula (1) below that includes at least two, and preferably from 2 to 10,000, silicon-bonded alkenyl groups on the molecule.

$$R^1{}_n SiO_{(4-n)/2} \quad (1)$$

In the formula, each $R^1$ is the same or different, substituted or unsubstituted monovalent hydrocarbon group, and n is a positive number from 1.95 to 2.04.

In formula (1), $R^1$ is a monovalent hydrocarbon group of 1 to 20, preferably 1 to 12, and more preferably 1 to 8, carbon atoms. Illustrative examples of the monovalent hydrocarbon group represented by $R^1$ include alkyl groups such as methyl, ethyl, propyl and butyl groups; cycloalkyl groups such as the cyclohexyl group; alkenyl groups such as vinyl, allyl, butenyl and hexenyl groups; aryl groups such as phenyl and tolyl groups; and aralkyl groups such as the β-phenylpropyl group. Some or all hydrogen atoms bonded to carbon atoms in these groups may be substituted with halogen atoms, as exemplified by the 3,3,3-trifluoropropyl group. Of these groups, methyl, vinyl, phenyl and trifluoropropyl groups are preferred, and methyl and vinyl groups are more preferred. In particular, of these, ones in which at least 50 mol % of the monovalent hydrocarbon groups represented by $R^1$ in the molecule are methyl groups are preferred, ones in which at least 80 mol % are methyl groups are more preferred, and ones in which all $R^1$ groups other than alkenyl groups are methyl groups are even more preferred.

In formula (1), n is a positive number from 1.95 to 2.04, and more preferably a positive number from 1.98 to 2.02. When this n value is not in the range of 1.95 to 2.04, the resulting cured product may not exhibit a sufficient rubber elasticity.

The organopolysiloxane (A) must have at least two alkenyl groups on the molecule.

In formula (1), it is preferable for 0.001 to 10 mol %, especially 0.01 to 5 mol %, of the $R^1$ groups to be alkenyl groups. It is preferable for the alkenyl groups to be vinyl groups and allyl groups, especially vinyl groups.

The organopolysiloxane (A) has an average degree of polymerization that is typically from 100 to 100,000, preferably from 1,000 to 100,000, more preferably from 3,000 to 50,000, and most preferably from 4,000 to 20,000. When the average degree of polymerization is less than 100, the silicone rubber composition ceases to satisfy the properties as a millable rubber and its roll mill kneadability and the like dramatically worsen, which is undesirable. This average degree of polymerization can be determined as the polystyrene-equivalent weight-average degree of polymerization in gel permeation chromatographic (GPC) analysis carried out under the following conditions.

[Measurement Conditions]

Developing solvent: toluene

Flow rate: 1 mL/min

Detector: differential refractive index detector (RI)

Columns: KF-805L×2 (Shodex)

Column temperature: 25° C.

Amount of sample injected: 30 μL (toluene solution having a concentration of 0.2 wt %)

The organopolysiloxane (A) is not particularly limited, provided that the conditions for the number of alkenyl groups on the molecule and the average degree of polymerization are satisfied. However, the organopolysiloxane is preferably a linear diorganopolysiloxane in which the backbone consists of repeating diorganosiloxane units ($R^1_2 SiO_{2/2}$, wherein $R^1$ is as indicated above; the same applies below) and both ends of the molecular chain are capped with triorganosiloxy groups ($R^1_3SiO_{1/2}$); ones in which both ends of the molecular chain are capped with, for example, trimethylsiloxy, dimethylvinylsiloxy, dimethylhydroxysiloxy, methyldivinylsiloxy or trivinylsiloxy groups are preferred; and ones in which the end groups are capped with siloxy groups having at least one vinyl group are especially preferred. These organopolysiloxanes may be of one type used alone, or two or more types of differing degrees of polymerization or molecular structures may be used in combination.

[(B) Thermal Black]

The thermal black serving as component (B) is an ingredient for increasing the dielectric constant of the silicone rubber composition, and moreover is a carbon black characterized in that the dielectric breakdown strength (BDV) does not decrease. The thermal black (B) has an average primary particle size which must be from 150 to 500 nm, and is preferably from 180 to 450 nm. In addition, it has a DBP oil absorption that is preferably from 35 to 50 mL/100 g, and more preferably from 37 to 47 mL/100 g. Component (B) may be of one type used alone, or two or more types may be used together.

Such a thermal black is not particularly limited as to its shape, so long as the average primary particle size is within the above range, and may be granular or may be powdery. In addition, when an addition reaction curing agent is used as the subsequently described component (D), desulfurized thermal black may be used in order to prevent curing from being hindered.

As used herein, "average primary particle size" refers to a value measured with a transmission electron microscope, and "DBP oil absorption" refers to a value measured by the method specified in JIS K 6217-4:2008.

A commercial product may be used as the thermal black serving as component (B). Illustrative examples include Thermax N990, Thermax N990 Ultra Pure, Thermax N991 Powder, Thermax N991 Powder Ultra Pure, Thermax N908 Stainless Powder and Thermax N908 Stainless Powder Ultra Pure (all available from CanCarb Inc.).

The thermal black (B) is included in an amount, per 100 parts by weight of the organopolysiloxane serving as component (A), of from 60 to 150 parts by weight, preferably from 70 to 130 parts by weight, and more preferably from 80 to 110 parts by weight. When this amount is less than 60 parts by weight, the high dielectric constant that is desired may not be obtained; when it exceeds 150 parts by weight, the volume resistivity decreases, the composition becomes electrically conductive, the dielectric breakdown strength (BDV) greatly decreases and the dielectric loss tangent becomes too high, as a result of which the reliability of the rubber high dielectric layer obtained by curing the composition ends up greatly declining. Moreover, mechanical properties such as the tensile strength and the tear strength of the cured silicone rubber obtained by curing the composition may become inadequate.

[(C) Reinforcing Fumed Silica]

The reinforcing fumed silica serving as component (C) is a substance which acts as a filler that imparts excellent mechanical properties to the silicone rubber composition, and which has a plurality of silanol (SiOH) groups on the surface. The reinforcing fumed silica (C) has a BET specific surface area which must be at least 50 m$^2$/g, and is preferably from 100 to 400 m$^2$/g. When this specific surface area is less than 50 m$^2$/g, the reinforcing effect by component (C) may be inadequate.

The reinforcing fumed silica (C) may be used in an untreated state or, if necessary, may be used after surface treatment with an organosilicon compound such as an organopolysiloxane, organopolysilazane, chlorosilane or alkoxysilane. From the standpoint of uniform dispersion of the thermal black and the fumed silica, it is preferable to use reinforcing fumed silica that has been surface treated beforehand with an organosilicon compound. This makes it possible to suppress decreases in the volume resistivity and dielectric breakdown strength (BDV) and an increase in the dielectric loss tangent even when a high content of the thermal black (B) is included. Component (C) may be of one type used alone, or two or more types may be used together.

A commercial product may be used as the reinforcing fumed silica (C). Illustrative examples include the following non-surface-treated or surface hydrophobized (i.e., hydrophilic or hydrophobic) fumed silicas: the Aerosil series such as Aerosil 130, Aerosil 200, Aerosil 300, Aerosil R-812, Aerosil R-972 and Aerosil R-974 (from Nippon Aerosil Co., Ltd.); Cabosil MS-5 and MS-7 (from Cabot Corporation); and Reolosil QS-102, 103 and MT-10, as well as Reolosil DM-20S and Reolosil DM-30S (from Tokuyama Corporation). A surface-treated hydrophobic fumed silica is especially preferred.

The content of the reinforcing fumed silica (C) per 100 parts by weight of the organopolysiloxane of component (A) is from 5 to 100 parts by weight, preferably from 10 to 80 parts by weight, and more preferably from 15 to 70 parts by weight. When this content falls outside of the above range, not only does the processability of the resulting silicone rubber composition decrease, the mechanical properties such as tensile strength and tear strength of the cured silicone rubber obtained by curing this silicone rubber composition are inadequate.

[(D) Curing Agent]

The curing agent serving as component (D) is not particularly limited, so long as it is able to cure the silicone rubber composition. Component (D) may be of one type used alone, or two or more types may be used together.

Component (D) is exemplified by (D-1) organic peroxide curing agents, (D-2) addition reaction curing agents, and co-vulcanization type curing agents obtained by combining (D-1) an organic peroxide curing agent and (D-2) an addition reaction curing agent.

Examples of (D-1) organic peroxide curing agents include 2,4-dicumyl peroxide, 2,5-dimethyl-bis(2,5-t-butylperoxy) hexane, di-t-butyl peroxide and t-butyl perbenzoate. The amount of organic peroxide added per 100 parts by weight of component (A) is preferably from 0.1 to 10 parts by weight, and most preferably from 0.2 to 5 parts by weight. When the content is too low, curing may be inadequate; when it is too high, the cured silicone rubber may yellow due to residues of decomposition by the organic peroxide.

An organohydrogenpolysiloxane and a hydrosilylation catalyst are used in combination as the addition reaction curing agent (D-2).

So long as the organohydrogenpolysiloxane includes at least 2, preferably 3 or more, more preferably from 3 to 200, and even more preferably from 4 to 100, silicon-bonded hydrogen atoms (i.e., SiH groups) per molecule, the structure may be a linear, cyclic, branched or three-dimensional network-like structure. The SiH groups may be situated at the ends of the molecular chain, partway along the molecular chain, or in both places.

This organohydrogenpolysiloxane may be one that is known as a crosslinking agent for addition reaction curable silicone rubber compositions. For example, one having the average compositional formula (2) below may be used.

$$R^{20}_p H_q SiO_{(4-p-q)/2} \qquad (2)$$

In formula (2), each $R^{20}$ is a monovalent hydrocarbon group that may be the same or different, preferably has no aliphatic unsaturated bonds, and preferably has from 1 to 12, especially from 1 to 8, carbon atoms. Specific examples include alkyl groups such as methyl, ethyl and propyl groups; cycloalkyl groups such as the cyclohexyl group; aryl groups such as phenyl and tolyl groups; and aralkyl groups such as benzyl, 2-phenylethyl and 2-phenylpropyl groups. Some or all of the hydrogen atoms on these groups may be substituted with halogen atoms or the like; such substituted groups are exemplified by the 3,3,3-trifluoropropyl group.

Also, p and q are positive numbers that satisfy the following conditions: $0<p<3$, preferably $0.5 \leq p \leq 2.2$, and more preferably $1.0 \leq p \leq 2.0$; $0<q<3$, preferably $0.002 \leq q \leq 1.1$, and more preferably $0.005 \leq q \leq 1$; and $0<p+q \leq 3$, preferably $1 \leq p+q \leq 3$, and more preferably $1.002 \leq p+q \leq 2.7$.

This organohydrogenpolysiloxane preferably has a viscosity at 25° C., as measured with a rotational viscometer by the method described in JIS K 7117-1:1999, of from 0.5 to 10,000 mPa·s, especially from 1 to 300 mPa·s.

Examples of such organohydrogenpolysiloxanes include 1,1,3,3-tetramethyldisiloxane, 1,3,5,7-tetramethylcyclotetrasiloxane, tris(hydrogendimethylsiloxy)methylsilane, tris(hydrogendimethylsiloxy)phenylsilane, methylhydrogencyclopolysiloxane, methylhydrogensiloxane-dimethylsiloxane cyclic copolymers, methylhydrogenpolysiloxane capped at both ends with trimethylsiloxy groups, dimethylsiloxane-methylhydrogensiloxane copolymers capped at both ends with trimethylsiloxy groups, dimethylpolysiloxane capped at both ends with dimethylhydrogensiloxy groups, dimethylsiloxane-methylhydrogensiloxane copolymers capped at both ends with dimethylhydrogensiloxy groups, methylhydrogensiloxane-diphenylsiloxane copolymers capped at both ends with trimethylsiloxy groups, methylhydrogensiloxane-diphenylsiloxane-dimethylsiloxane copolymers capped at both ends with trimethylsiloxy groups, methylhydrogensiloxane-methylphenylsiloxane-dimethylsiloxane copolymers capped at both ends with trimethylsiloxy groups, methylhydrogensiloxane-dimethylsilane-diphenylsiloxane copolymers capped at both ends with dimethylhydrogensiloxy groups, methylhydrogensiloxane-dimethylsiloxane-methylphenylsiloxane copolymers capped at both ends with dimethylhydrogensiloxy groups, copolymers consisting of $(CH_3)_2HSiO_{1/2}$ units, $(CH_3)_3SiO_{1/2}$ units and $SiO_{4/2}$ units, copolymers consisting of $(CH_3)_2HSiO_{1/2}$ units and $SiO_{4/2}$ units, copolymers consisting of $(CH_3)_2HSiO_{1/2}$ units, $SiO_{4/2}$ units and $(C_6H_5)_3SiO_{1/2}$ units, and any of the foregoing compounds in which some or all of the methyl groups are substituted with other alkyl groups, phenyl groups or the like.

The content of the organohydrogenpolysiloxane per 100 parts by weight of component (A) is preferably from 0.1 to 10 parts by weight. Also, it is suitable for the proportion of silicon-bonded hydrogen atoms (≡SiH groups) per alkenyl group in component (A) to be from 0.5 to 10, and preferably from 0.7 to 5. At less than 0.5, crosslinking may be inadequate and a sufficient mechanical strength may not be obtained; at more than 10, the physical properties after curing may decrease and the compression set may become large.

The hydrosilylation catalyst is a catalyst which promotes a hydrosilylation addition reaction between alkenyl groups on component (A) and silicon-bonded hydrogen atoms (SiH groups) on the organohydrogenpolysiloxane. The hydrosilylation catalyst is exemplified by platinum family metal catalysts, and may be an uncombined platinum family metal or a platinum family metal compound. Platinum family metal catalysts that have hitherto been known as catalysts for addition reaction curable silicone rubber compositions may be used. Illustrative examples include platinum catalysts such as particulate platinum metals adsorbed onto a support such as silica, alumina or silica gel, platinic chloride, chloroplatinic acid and an alcohol solution of chloroplatinic acid hexahydrate, as well as palladium catalysts and rhodium catalysts. Platinum or a platinum compound (platinum catalyst) is preferred.

The amount of this catalyst added should be an amount that can promote the addition reaction. Generally, expressed in terms of the amount of platinum family metal, an amount in the range of 1 ppm by weight to 1% by weight per 100 parts by weight of the organopolysiloxane serving as component (A) is used, with an amount in the range of 10 to 500 ppm by weight being preferred. When the amount added is less than 1 ppm by weight, the addition reaction may not be fully promoted and curing may be inadequate. On the other hand, when the amount added exceeds 1% by weight, further addition beyond this amount has little influence on the reactivity and may be uneconomical.

In cases where a co-vulcanization type curing agent obtained by combining (D-1) an organic peroxide curing agent and (D-2) an addition reaction curing agent is used, components (D-1) and (D-2) may be included and used in combination within the respective ranges in content indicated above.

[(E) Dispersing Agent for Filler]

In this invention, in addition to above components (A) to (D), various alkoxysilanes, phenyl group-containing alkoxysilanes and hydrolyzates thereof, diphenylsilanediols, carbon-functional silanes, silanol group-containing low-molecular-weight siloxanes and disilanol-terminated organopolysiloxanes may be used as dispersing agents for the reinforcing fumed silica serving as component (C).

When component (E) is used, the amount thereof per 100 parts by weight of component (A) is preferably from 0.1 to 50 parts by weight, and more preferably from 1 to 20 parts by weight. When too little is used, the effects of addition may not be observable; when too much is used, the plasticity of the compound may become too low, as a result of which, in kneading means such as a roll mill, sticking of the compound to the rolls may arise, worsening the workability of the compound with rolls.

[Other Ingredients]

In addition to the above ingredients, fillers and additives known to heat-curable silicone rubber compositions, including fillers such as ground quartz, diatomaceous earth and calcium carbonate, colorants, tear strength enhancers, heat resistance enhancers, flame retardancy enhancers such as platinum compounds, acid acceptors, thermal conductivity enhancers such as alumina and silicon nitride and mold parting agents, may be optionally added as other ingredients to the silicone rubber composition of the present invention within ranges that do not detract from the objects of the invention. These other ingredients may be of one type used alone or two or more types may be used together.

Method of Preparing Composition:

The millable silicone rubber composition of the invention can be obtained by mixing the ingredients making up the composition in a known mixing apparatus such as a kneader, a Banbury mixer or a two-roll mill. In cases where a composition containing above components (A) to (D) is obtained as the silicone rubber composition, it is preferable to mix together (A) the organopolysiloxane and (C) the reinforcing fumed silica so as to give a mixture, and then mix (B) the thermal black into this mixture and subsequently add (D) the curing agent. In cases where other ingredients are also included in the composition containing components (A) to (D), it is preferable to mix together (A) the organopolysiloxane, (B) the thermal black, (C) the reinforcing fumed silica and the other ingredients so as to give a mixture, and then add (D) the curing agent to this mixture.

Method of Forming/Molding the Silicone Rubber:

A known method may be selected as the forming/molding method according to the shape and size of the intended molded articles. Examples of such methods include casting, compression molding, injection molding, calendering and extrusion.

Curing Conditions:

The curing conditions may be known conditions for the forming/molding method used, and are generally a temperature of from 60 to 450° C. and a period of from several seconds to about one day. In addition, a post-cure (secondary cure) may be carried out in an oven at 200° C. or more, preferably from 200 to 250° C., for a period of at least 1 hour, preferably from about 1 hour to about 70 hours, and more preferably from 1 to 10 hours, for such purposes as to lower the compression set of the resulting cured product, reduce the low-molecular-weight siloxane ingredients remaining in the resulting silicone rubber, and remove organic peroxide decomposition products within the silicone rubber.

Cured Product:

The cured silicone rubber has, in the subsequently described measurement method, a dielectric constant that must be of at least 10, and is preferably from 10 to 50 and more preferably from 11 to 30. At a dielectric constant below 10, the electric field relaxation effect that disperses the electrical field which has concentrated at the terminal of a high-voltage power cable may be inadequate. In addition, it is critical for the dielectric loss tangent to be 0.1 or less. Also, the volume resistivity must be from $1.0 \times 10^{13}$ to $1.0 \times 10^{17}$ Ω·cm, and is preferably from $1.0 \times 10^{13}$ to $5.0 \times 10^{16}$ Ω·cm, and more preferably from $1.0 \times 10^{14}$ to $1.0 \times 10^{16}$ Ω·cm. At a volume resistivity below $1.0 \times 10^{13}$ Ω·cm, the insulation properties are inadequate, as a result of which dielectric breakdown may occur due to concentration of the electric field. At a volume resistivity above $1.0 \times 10^{17}$ 2 Ω·cm, the desired high dielectric properties cannot be obtained. Moreover, in the subsequently described method of measurement, the dielectric breakdown strength (BDV) must be at least 7 kV/mm, and is preferably at least 7.5 kV/mm and more preferably at least 8 kV/mm. When the dielectric breakdown strength (BDV) is less than 7 kV/mm, the cured silicone rubber is unable to withstand electric field concentration at an intermediate joint or terminal joint on a high-voltage power cable, which may result in short circuiting, heat generation and combustion or breakdown.

In cases where the cured silicone rubber satisfies all of these conditions, electrical stresses (electric lines of force) are uniformly dispersed without concentrating at the joint, resulting in relaxation of the electric field. Therefore, deterioration of the cable insulation by electrical stresses is reduced and the electrical properties of the cable are stably maintained for a long period of time.

On the other hand, when a cured silicone rubber that fails to satisfy even one of these conditions is used as an electric field relaxation layer at an intermediate joint or terminal joint on a power cable, electrical stresses (electric lines of force) concentrate in the area of connection, the cable insulation that is the housing incurs a load and the amount of electrical charge increases, causing partial discharge to arise. When this repeatedly occurs, the insulation resistance in this area gradually decreases, accelerating cable deterioration and ultimately leading to insulation breakdown and shorting of the cable.

EXAMPLES

The invention is illustrated more fully below by way of Examples and Comparative Examples, although the invention is not limited by these Examples.

Example 1

Base Compound 1 was prepared by adding together 50 parts by weight of organopolysiloxane crude rubber (A-1) consisting of 99.975 mol % of dimethylsiloxane units and 0.025 mol % dimethylvinylsiloxy units and having an average degree of polymerization of about 6,000, 50 parts by weight of an organopolysiloxane crude rubber (A-2) consisting of 99.85 mol % of dimethylsiloxane units, 0.125 mol % of methylvinylsiloxane units and 0.025 mol % of dimethylvinylsiloxy units and having an average degree of polymerization of about 6,000, 25 parts by weight of fumed silica having a BET specific surface area of 200 m$^2$/g (Aerosil 200, Nippon Aerosil Co., Ltd.) and, as a dispersant, 5 parts by weight of dimethylpolysiloxane having silanol groups at both ends, an average degree of polymerization of 4 and a viscosity at 25° C. of 15 mPa·s, and heating these ingredients at 170° C. for 2 hours under mixing in a kneader.

Compound 1 was then prepared by mixing 80 parts by weight of thermal black having an average primary particle size of 280 nm and a DBP oil absorption of 44 mL/100 g (Thermax N990, from CanCarb Inc.) with 130 parts by weight of Base Compound 1.

Next, Composition 1 was prepared by mixing 0.53 part by weight of a methylhydrogenpolysiloxane having pendant SiH groups (D-2-1, a dimethylsiloxane-methylhydrogensiloxane copolymer having trimethylsiloxy groups at both ends, a degree of polymerization of 38 and a SiH group content of 0.0074 mol %), 0.2 part by weight of a platinum catalyst (D-2-2; platinum concentration, 1 wt %) and, as a reaction regulator, 0.11 part by weight of ethynylcyclohexanol with 210 parts by weight of Compound 1.

Example 2

Base Compound 2 was prepared by adding together 50 parts by weight of organopolysiloxane crude rubber (A-1) consisting of 99.975 mol % of dimethylsiloxane units and 0.025 mol % dimethylvinylsiloxy units and having an average degree of polymerization of about 6,000, 50 parts by weight of an organopolysiloxane crude rubber (A-2) consisting of 99.85 mol % of dimethylsiloxane units, 0.125 mol % of methylvinylsiloxane units and 0.025 mol % of dimethylvinylsiloxy units and having an average degree of polymerization of about 6,000, 30 parts by weight of hydrophobized fumed silica (Aerosil R-972, Nippon Aerosil Co., Ltd.) having a BET specific surface area of 130 m$^2$/g and, as a dispersant, 2 parts by weight of a disilanol-terminated dimethylpolysiloxane, an average degree of polymerization of 4, and a viscosity at 25° C. of 15 mPa·s, and heating these ingredients at 170° C. for 2 hours under mixing in a kneader. Compound 2 was then prepared by mixing 105 parts by weight of thermal black having an average primary particle size of 280 nm and a DBP oil absorption of 44 mL/100 g (Thermax N990 Ultra Pure, from CanCarb Inc.) with 132 parts by weight of Base Compound 2. Aside from using Compound 2 instead of Compound 1, Composition 2 was obtained in the same way as in Example 1.

Example 3

Aside from setting the amount of thermal black included to 60 parts by weight of thermal black having an average primary particle size of 280 nm and a DBP oil absorption of 44 mL/100 g (Thermax N991, from CanCarb Inc.), Composition 3 was obtained in the same way as in Example 1.

Example 4

Aside from setting the amount of thermal black included to 60 parts by weight of thermal black having an average primary particle size of 280 nm and a DBP oil absorption of 44 mL/100 g (Thermax N991, from CanCarb Inc.) and using 1.0 part by weight of 2,5-dimethyl-bis(2,5-t-butylperoxy)hexane (trade name: Perhexa 25B, from NOF Corporation) (D-1-1) instead of methylhydrogenpolysiloxane (D-2-1) and platinum catalyst (D-2-2) as the curing agent, Composition 4 was obtained in the same way as in Example 1.

Comparative Example 1

Aside from using 20 parts by weight of carbon black having an average primary particle size of 35 nm and a DBP oil absorption o 160 mL/100 g (Denka Black, from Denka Company, Ltd.) instead of the thermal black mentioned in Example 1, Composition 5 was obtained in the same way as in Example 1.

Comparative Example 2

Aside from setting the amount of thermal black included to 50 parts by weight, Composition 6 was obtained in the same way as in Example 1.

Comparative Example 3

Aside from setting the amount of thermal black included to 155 parts by weight, Composition 7 was obtained in the same way as in Example 1.

Comparative Example 4

Aside from setting the amount of thermal black included to 160 parts by weight, Composition 8 was obtained in the same way as in Example 1.

Comparative Example 5

Aside from using 80 parts by weight of carbon black having an average primary particle size of 120 nm and a DBP oil absorption of 40 mL/100 g (Asahi #15, from Asahi Carbon KK) instead of the thermal black mentioned in Example 1 and using 2,5-dimethyl-bis(2,5-t-butylperoxy)hexane (trade name: Perhexa 25B, from NOF Corporation) (D-1-1) instead of methylhydrogenpolysiloxane (D-2-1) and platinum catalyst (D-2-2) as the curing agent, Composition 9 was obtained in the same way as in Example 1.

Measurement of Various Physical Properties:

Using cured rubber test sheets fabricated in general accordance with JIS K 6249:2003, various rubber properties [hardness (Durometer A), tensile strength, elongation at break] and electrical characteristics [dielectric constant, dielectric loss tangent, volume resistivity, dielectric breakdown strength (BDV)] were measured for Silicone Rubber Compositions 1 to 9 prepared in Examples 1 to 4 and Comparative Examples 1 to 5. The results are presented in Table 1.

(Curing Conditions)

Cured rubber test sheets measuring 100 mm square and having thicknesses of 5 mm, 2 mm and 1 mm were fabricated by press-curing the silicone rubber compositions at a molding pressure of 7.8 MPa (80 kgf/cm$^2$) and 120° C. for 10 minutes, followed by a 4-hour post-cure at 200° C. (secondary vulcanization).

[Measurement of Rubber Properties]

The rubber properties were measured in general accordance with JIS K 6249:2003 using rubber test sheets having a thickness of 2 mm obtained under the above curing conditions.

[Measurement of Dielectric Constant and Dielectric Loss Tangent]

Rubber test sheets having a thickness of 5 mm obtained under the same curing conditions as for measurement of the rubber properties were used as the samples for measurement of the dielectric constant and the dielectric loss tangent.

With regard to the samples for measuring the dielectric constant and the dielectric loss tangent, the dielectric constant and the dielectric loss tangent were measured using an automatic Schering bridge (name of apparatus: DAC-IM-D1) from Soken Electric Co., Ltd. The electrodes used were a 50 mm diameter main electrode, a 54×80 mm diameter guard electrode and an 80 mm diameter counterelectrode. Measurement was carried out at a frequency of 50 Hz. The measurement at an applied voltage of 500 V was read off.

[Measurement of Volume Resistivity]

The volume resistivity was measured in general accordance with JIS K 6249:2003 using rubber test sheets having a thickness of 1 mm obtained under the same curing conditions as the rubber test sheets for measuring the rubber properties.

[Measurement of Dielectric Breakdown Strength (BDV)]

Using a rubber test sheet having a thickness of 1 mm obtained under the same curing conditions as the rubber test sheets for measuring the rubber properties, the dielectric breakdown strength was measured by the method described in JIS K 6249:2003 at a voltage rise rate of 2 kV/s and using Trans Oil A from Showa Shell Sekiyu KK.

TABLE 1

| | Ingredients (pbw) | Example | | | | Comparative Example | | | | |
| --- | --- | --- | --- | --- | --- | --- | --- | --- | --- | --- |
| | | 1 | 2 | 3 | 4 | 1 | 2 | 3 | 4 | 5 |
| (A) Organo-polysiloxane | Organopolysiloxane (A-1) | 50 | 50 | 50 | 50 | 50 | 50 | 50 | 50 | 50 |
| | Organopolysiloxane (A-2) | 50 | 50 | 50 | 50 | 50 | 50 | 50 | 50 | 50 |

TABLE 1-continued

| | Ingredients (pbw) | Example 1 | Example 2 | Example 3 | Example 4 | Comparative Example 1 | Comparative Example 2 | Comparative Example 3 | Comparative Example 4 | Comparative Example 5 |
|---|---|---|---|---|---|---|---|---|---|---|
| (B) Thermal black | Thermax N990 | 80 | | | | | 50 | 155 | 160 | |
| | Thermax N990 Ultra Pure | | 105 | | | | | | | |
| | Thermax N991 | | | 60 | 60 | | | | | |
| | Carbon black (Denka Black) | | | | | 20 | | | | |
| | Carbon black (Asahi #15) | | | | | | | | | 80 |
| (C) Reinforcing fumed silica | Aerosil 200 | 25 | | 25 | 25 | 25 | 25 | 25 | 25 | 25 |
| | Aerosil R-972 | | 30 | | | | | | | |
| (D) Curing agent | Methylhydrogenpolysiloxane with pendant SiH groups (D-2-1) | 0.53 | 0.59 | 0.48 | | 0.38 | 0.45 | 0.59 | 0.73 | |
| | Platinum catalyst (Pt concentration, 1 wt %; D-2-2) | 0.2 | 0.2 | 0.2 | | 0.2 | 0.2 | 0.2 | 0.3 | |
| | Perhexa 25B (D-1-1) | | | | 1.0 | | | | | 1.1 |
| (E) Disilanol-terminated dimethylpolysiloxane (average degree of polymerization, 4; viscosity, 15 mPa · s) | | 5 | 2 | 5 | 5 | 5 | 5 | 5 | 5 | 5 |
| Ethynylcyclohexanol | | 0.11 | 0.12 | 0.10 | | 0.08 | 0.09 | 0.12 | 0.15 | |
| Hardness: Type A | | 54 | 53 | 52 | 55 | 51 | 51 | 71 | 74 | 61 |
| Tensile strength (MPa) | | 6.1 | 6.6 | 6.2 | 6.6 | 7.9 | 6.1 | 5.9 | 5.9 | 6.0 |
| Elongation at break (%) | | 430 | 370 | 420 | 320 | 630 | 430 | 230 | 190 | 280 |
| Dielectric constant | | 12.1 | 15.6 | 10.4 | 12.0 | 200 | 7.5 | 21.4 | 290< | 290< |
| Volume resistivity ($\Omega \cdot cm$) | | $1.7 \times 10^{15}$ | $3.0 \times 10^{15}$ | $4.2 \times 10^{15}$ | $1.9 \times 10^{15}$ | $4.4 \times 10^{6}$ | $1.1 \times 10^{16}$ | $1.1 \times 10^{13}$ | $1.8 \times 10^{6}$ | $5.4 \times 10^{11}$ |
| Dielectric loss tangent | | 0.07 | 0.06 | 0.04 | 0.02 | 0.5< | 0.0191 | 0.18 | 0.5< | 0.5< |
| Dielectric breakdown strength (kV/mm) | | 8 | 9 | 12 | 7 | <1 | 18 | 4 | <1 | <1 |

The invention claimed is:

1. A high dielectric insulating silicone rubber composition comprising:
    (A) 100 parts by weight of an organopolysiloxane of average compositional formula (1) below:

$$R^1_n SiO_{(4-n)/2} \quad (1)$$

wherein each $R^1$ is the same or different, substituted or unsubstituted monovalent hydrocarbon group, and n is a positive number from 1.95 to 2.04,
    (B) 60 to 150 parts by weight of thermal black having an average primary particle size of from 150 to 500 nm,
    (C) 5 to 100 parts by weight of reinforcing fumed silica having a specific surface area as measured by the BET adsorption method of at least 50 $m^2/g$, and
    (D) 0.1 to 10 parts by weight of a curing agent,
wherein the silicone rubber composition, when cured, has a dielectric constant of 10 or more, a volume resistivity of from $1.0 \times 10^{13}$ to $1.0 \times 10^{17}$ $\Omega \cdot cm$, a dielectric loss tangent of 0.1 or less and a dielectric breakdown strength (BDV) of 7 kV/mm or more.

2. The high dielectric insulating silicone rubber composition of claim 1, wherein the thermal black (B) has a DBP oil absorption of from 35 to 50 mL/100 g.

3. The high dielectric insulating silicone rubber composition of claim 1 or 2, wherein component (C) is a hydrophobic fumed silica.

4. The high dielectric insulating silicone rubber composition of claim 1, wherein component (D) is an addition reaction curing agent comprising:
    an organohydrogenpolysiloxane of average compositional formula (2) below:

$$R^{20}_p H_q SiO_{(4-p-q)/2} \quad (2)$$

wherein each $R^{20}$ is the same or different, substituted or unsubstituted monovalent hydrocarbon group, and p and q are positive numbers which satisfy the conditions $0<p<3$, $0<q<3$ and $0<p+q\leq 3$, and
    a hydrosilylation catalyst.

5. The high dielectric insulating silicone rubber composition of claim 1, wherein component (D) is an organic peroxide curing agent.

6. An electric field relaxation layer in a power cable intermediate joint or terminal joint, which layer comprises a cured product of the high dielectric insulating silicone rubber composition of claim 1.

* * * * *